United States Patent [19]

Imai et al.

[11] 4,001,159

[45] Jan. 4, 1977

[54] AQUEOUS DISPERSION OF OLEFIN-ACRYLATE COPOLYMER

[75] Inventors: Shozaburo Imai; Masaaki Hirooka, both of Ibaragi, Japan

[73] Assignee: Sumitomo Chemical Company, Limited, Osaka, Japan

[22] Filed: Jan. 20, 1975

[21] Appl. No.: 542,684

Related U.S. Application Data

[63] Continuation-in-part of Ser. No. 353,493, April 23, 1973, abandoned.

[52] U.S. Cl. ............ 260/29.6 TA; 260/17 R; 260/29.6 R; 260/29.6 RW; 260/29.6 WB; 260/29.6 WA; 260/29.6 MQ; 260/29.6 MN; 260/29.6 ME; 428/473; 428/500; 428/514

[51] Int. Cl.$^2$ .................................. C08L 23/22

[58] Field of Search .......... 260/29.6 R, 29.6 XA, 260/29.6 TA, 29.6 MQ, 29.6 MN, 29.6 ME, 29.6 PM, 86.7, 89.5 AW, 94.8

[56] References Cited

UNITED STATES PATENTS

| | | | |
|---|---|---|---|
| 3,642,676 | 2/1972 | Saunders et al. | 260/29.6 XA |
| 3,700,648 | 10/1972 | Hirooka et al. | 260/63 R |
| 3,738,954 | 6/1973 | Gintz | 260/29.6 R |

FOREIGN PATENTS OR APPLICATIONS

| | | |
|---|---|---|
| 2,110,189 | 9/1971 | Germany |
| 1,089,279 | 11/1967 | United Kingdom |

OTHER PUBLICATIONS

Hirooka et al., *Chemical Abstracts*, vol. 78:111,936q (1973).

Sugiura et al., *Chemical Abstracts*, vol. 80:28,400f (1974).

Arai, et al., *Chemical Abstracts*, vol. 80:122,348s (1974).

*Primary Examiner*—Murray Tillman
*Assistant Examiner*—W. C. Danison, Jr.
*Attorney, Agent, or Firm*—Stevens, Davis, Miller & Mosher

[57] ABSTRACT

An aqueous dispersion of 1 – 300 parts by weight of an olefin-acrylate copolymer, said olefin having 3 to 20 carbon atoms, in 100 parts by weight of water, the dispersion optionally containing a surface active agent in a proportion of 0.1 to 20 parts by weight per 100 parts by weight of the copolymer, in which dispersion the copolymer forms substantially the dispersed phase and the water forms the continuous phase. Said dispersion can be used in paints, fiber-treating agents, paper-treating agents, leather-treating agents and adhesives, and forms a film having excellent resistance to alkali, water, weathering and heat. The above copolymer is preferably an alternating copolymer although it may be a random copolymer.

24 Claims, No Drawings

AQUEOUS DISPERSION OF OLEFIN-ACRYLATE COPOLYMER

CROSS-REFERENCE TO RELATED APPLICATION

This application is a continuation-in-part of application Ser. No. 353,493, filed Apr. 23, 1973, now abandoned.

This invention relates to an aqueous dispersion of a copolymer. More particularly, it relates to an aqueous dispersion in which an olefin-acrylate copolymer forms substantially the dispersed phase and water is the continuous phase.

We already succeeded in effectively copolymerizing olefins and acrylates, and particularly, we were the first to obtain alternating copolymers of these monomers (refer to British Pat. Nos. 1,089,279; 1,123,722; 1,123,723 and 1,123,724). Further, we found that when these monomers were subjected to copolymerization together with other monomers, multi-component copolymers having various additional properties could be obtained (refer to British Pat. No. 1,187,105). The introduction of unsaturation into the copolymer results in sulfur-curable rubbers (refer to West German Patent Application No. 2,110,189), and the copolymerization of the above monomers and halogen-containing ethylenically unsaturated compounds as third monomeric component can result in amine-curable rubbers (refer to French Pat. No. 7,107,271). Furthermore, the introduction of acryloyl halides into the copolymer results in reactive copolymers (refer to Belgian Pat. No. 786,003). These copolymers were for the first time found by the present inventors and the properties thereof have been substantially unknown.

The present inventors have found that such olefin-acrylate copolymers can be dispersed in water into emulsions and that the emulsions have excellent characteristics and various uses.

It is an object of this invention to provide an aqueous dispersion of an olefin-acrylate copolymer.

It is another object of the invention to provide an aqueous dispersion of an olefin-acrylate alternating copolymer having excellent water-resistance, alkali-resistance and thermal resistance.

It is a further object of the invention to provide an aqueous dispersion of the copolymer which can be used as coating composition, fiber-treating agent, building mortar, paper-treating agent, leather-treating agent and adhesive.

Other objects and the advantages of the invention will become apparent from the following description.

Aqueous dispersions of various copolymers have heretofore been known and used as coating composition, fiber-treating agent, building mortar, paper-treating agent, leather-treating agent, adhesive and the like. Examples of said dispersions are those of vinyl acetate polymers, ethylene-vinyl acetate copolymers, acrylate polymers, vinyl acetate-acrylate copolymers and the like. These polymers, however, do not always have sufficient performance and properties. For instance, vinyl acetate polymers are inferior in alkali-resistance and are not so good in weather-resistance. Acrylate polymers are superior in alkali-resistance to vinyl acetate polymers but are not satisfactory in water-resistance. On the other hand, the olefin-acrylate copolymer, particularly the olefin acrylate alternating copolymer used in this invention has remarkably excellent water-resistance and alkali-resistance. For example, comparing hydrolyzability in an alkaline solution at 50° C, polybutyl acrylate is hydrolyzed by 80% in 10 hrs, while an isobutylene-butyl acrylate alternating copolymer is hydrolyzed by only 5%. In addition, the olefin-acrylate copolymer is superior in thermal resistance, and the thermal decomposition temperature of the copolymer is more than 10° C higher than that of the corresponding acrylate homopolymer.

In particular, olefin-acrylate multi-component copolymers containing a copolymerized acryloyl halide and/or maleic anhydride component are very interesting. Since it is well known that acid halide groups are severely reacted with water into acid groups, it is quite surprising and unexpected that copolymers containing acryloyl halide as one component form stable aqueous emulsions. The aqueous dispersion of the olefin-acrylate copolymer having acid halide groups can stably have the acid halide groups in the system and can be used as reactive polymer composition. Moreover, useful aqueous dispersions can be formed from multi-component copolymers obtained by copolymerizing various other monomers than acryloyl halides with olefins and acrylates.

According to this invention, there is provided an aqueous dispersion of a copolymer, characterized in that the dispersion contains 1 to 300 parts by weight of an olefin-acrylate copolymer, said olefin having 3 to 20 carbon atoms, per 100 parts by weight of water, said copolymer forms substantially the dispersed phase and water forms the continuous phase.

The above dispersion can effectively be obtained by using a surface active agent. Therefore, this invention also provides an aqueous dispersion of an olefin-acrylate copolymer, said olefin having 3 to 20 carbon atoms, wherein the copolymer forms substantially the dispersed phase and water forms the continuous phase, which comprises 0.1 to 20 parts by weight of a surface active agent per 100 parts by weight of the copolymer.

The olefin-acrylate copolymers used in this invention include all copolymers of olefins having 3 to 20 carbon atoms and acrylates, including binary copolymers and multi-component copolymers, and also include multi-component copolymers of the olefins, the acrylates and other copolymerizable vinyl monomers.

As the olefin, there may be used any of terminally unsaturated or internally unsaturated olefin compounds having 3 to 20 carbon atoms copolymerizable with acrylates. Said olefin compounds may have halogen atom, cycloaliphatic radical or aromatic radical at a position other than the double bond. Aliphatic α-olefin compounds are particularly preferable. Preferable examples of the olefin in the olefin-acrylate copolymer used in this invention are isobutylene, propylene, butene-1, butene-2, pentene-1, 2-methyl-butene-1, hexene-1, 4-methyl-pentene-1, 2-methyl-pentene-1, octadecene-1, 4-phenyl-butene-1, cyclopentene, norbornene-2, vinylcyclobutane, 2-methyl-4-chloro-pentene-1 and the like. Of these, isobutylene and propylene are particularly effective.

There is no particular limitation concerning the alcohol moiety of the acrylate to be copolymerized with the olefin, though hydrocarbon groups or halogen-substituted hydrocarbon groups having 1 to 20 carbon atoms are preferable. These groups may be alkyl, aryl, aralkyl, alkylaryl, cycloalkyl, alkenyl, aralkenyl, alkenylaryl, cycloalkenyl or the like or these groups substituted by halogen. The halogen may be fluorine, chlorine, bromine or iodine. The acrylate specifically includes, for example, methyl acrylate, ethyl acrylate, propyl acrylate, n-butyl acrylate, t-butyl acrylate, n-amyl acrylate, n-hexyl acrylate, 2-ethylhexyl acrylate, octadecyl acrylate, o-tolyl acrylate, benzyl acrylate, cyclohexyl acrylate, 2-chloroethyl acrylate, vinyl acrylate, allyl acrylate, isobutenyl acrylate, 1'-butenyl acrylate, crotyl acrylate, 2'-butenyl acrylate, cinnamyl acrylate, 3'-cyclopentenyl acrylate, citronellyl acrylate, geranyl acrylate, 5'-norbornen-2'-yl-methyl acrylate, β-chloroallyl acrylate and the like.

The olefin-acrylate copolymer used in this invention may preferably contain 5 to 60 mole percent of the olefin and 40 to 95 mole percent of the acrylate, and more preferably 30 to 50 mole percent of the olefin and 50 to 70 mole percent of the acrylate. The most important copolymer thereof is an alternating copolymer in which the olefin and the acrylate are alternately bonded to each other.

The copolymer used in this invention contains predominantly the olefin and the acrylate, and may, in addition, contain other ethylenically unsaturated compounds. Such multi-component copolymer has improved polymer characteristics. As the ethylenically unsaturated compound, there may be employed various monomers, though the group (A) monomers and the group (B) monomers effective to alternating copolymers are preferable. Preferable are monomers disclosed in British Pat. No. 1,187,105, U.S. Pat. No. 3,700,648, U.S. Pat. No. 3,692,754 and Japanese Patent Application No. 13,995/73. That is, there may be exemplified the group (A) monomers, representatives of which are α-olefins, internal olefins, haloolefins, styrene homologs, diene compounds, unsaturated esters of carboxylic acids, unsaturated ethers and the like and the group (B) monomers, representatives of which are acrylonitrile, acrylic acid, salts of acrylic acid, acryloyl halides, acrylamides, maleic compounds and the like.

When the third component monomers are used, the amount thereof is preferably 0.1 to 25 mole percent, more preferably 0.1 to 20 mole percent, based on the total mole of the monomers used. When the third component monomers are used in the alternating copolymerization, and when they are the group (A) monomers, they are substituted for a part of the olefin, and when they are the group (B) monomers, they are substituted for a part of the acrylate to be bonded to the olefin, whereby alternating regulation concerning the (A) and (B) groups is maintained.

The copolymer used in this invention has generally a high molecular weight which corresponds to an intrinsic viscosity of 0.1 to 10 dl/g as measured in benzene at 30° C.

In copolymerizing the olefin and the acrylate, a radical polymerization method may be preferable. When it is desired to obtain a particularly high molecular weight copolymer, a good result is obtained by adding a Lewis acid capable of forming a complex with the carbonyl group of the acrylate, such as metal halides, because degradative chain transfer reaction becomes thereby difficult to cause. As the Lewis acid, there may be employed any compound capable of forming a complex with the lone electron pair of the carbonyl group, though for example, halides of elements of Groups IIb, IIIb, IVb, Vb and VIII of the Mendeleev Periodic Table, particularly halides of aluminum, boron, zinc and tin, are effective. Said compound specifically includes, for instance, aluminum chloride, alkylaluminum halides, boron trichloride, boron trifluoride, alkylboron halides, zinc chloride, tin tetrachloride, alkyltin halides and the like. The complexed copolymerization with said compound is catalyzed and promoted by radical polymerization catalysts, oxygen, organometallic compounds, light and radiations.

A particularly important reaction is a copolymerization which produces an alternating copolymer. In order to effectively obtain the alternating copolymer, a system in which an aluminum or boron compound is used as catalyst is particularly preferable. The alternating copolymerization reaction is described in detail in British Pat. Nos. 1,187,105 and 1,089,279; and U.S. Pat. No. 3,000,648. That is, said system forms a complex with the carbonyl group of the acrylate and simultaneously the organoaluminum halide or organo-boron halide acts as initiator to produce an alternating copolymer effectively. A particularly preferable system is a system in which an organoaluminum halide or organoboron halide or a corresponding component is used.

The aqueous dispersion of this invention can be obtained by dispersing 1 to 300 parts by weight of the olefin-acrylate copolymer in 100 parts by weight of water. The aqueous dispersion may be prepared by various method. In general, the olefin-acrylate copolymer is first dissolved in a solvent, the resulting solution is dispersed in water and then the solvent is stripped. When the above operations are effected in the presence of a suitable surface active agent, a stable aqueous dispersion in which the copolymer is well dispersed in water can be obtained. Said surface active agent for dispersion is preferably used in an amount of 0.1 to 20 parts by weight per 100 parts by weight of the olefin-acrylate copolymer, whereby a good result is obtained. The surface active agent includes anionic, nonionic and cationic surfactants, and particularly, nonionic and anionic surfactants are preferable.

As the surface active agent, there may be used anionic surfactants, such as alkylbenzenesulfonic acid salts, alkylnaphthalenesulfonic acid salts, dialkylsulfosuccinic acid salts, alkyl phosphate salts, fatty acid salts, higher alcohol sulfate salts, naphthalenesulfonic acid-formaldehyde condensates, polyoxyethylene sulfate salts and the like; nonionic surfactants, such as polyoxyethylene alkyl ethers, polyoxyethylene alkylphenyl ethers, polyoxyethylene acyl esters, sorbitan fatty acid esters, polyoxyethylene alkylamines, polyoxyethylene alkylamides and the like; or cationic surfactants, such as alkylamine salts, polyoxyethylene alkylamine salts, alkylamine acetates and the like. Specific examples of these compounds include, for example, sodium laurylbenzenesulfonate, sodium laurylnaphthalene sulfonate, sodium dioctyl sulfosuccinate, dioctyl phosphate salt, sodium oleate, sodium salt of semi-hard beef tallow, potassium oleate, potassium castor oil, sodium laurylalcohol sulfate, sodium polyacrylate, naphthalenesulfonic acid-formaldehyde condensate, sodium salt of polyoxyethylene octyl sulfate, sodium salt of polyoxyethylene octylphenyl sulfate, polyoxyethylene lauryl ether, polyoxyethylene cetyl ether, polyoxyethylene stearyl ether, polyoxyethylene oleyl ether, polyoxyethylene octylphenyl ether, polyoxyethylene nonylphenyl ether, polyethylene glycol laurate, polyethylene glycol stearate, polyethylene glycol distearate, polyethylene glycol oleate, oxyethylene-oxypropylene block copolymer, sorbitan laurate, sorbitan stearate, sorbitan distearate, sorbitan oleate, sorbitan sesquioleate, sorbitan trioleate, polyoxyethylene sorbitan laurate, polyoxyethylene sorbitan stearate, polyoxyethylene sorbitan oleate, polyoxyethylene laurylamine, polyoxyethylene laurylamide, laurylamine acetate, hard beef tallow propylenediamine dioleate, and the like.

Further, the purpose of dispersion can also be achieved by a combination of an organic acid capable of forming a surfactant, such as a higher fatty acid, for example, oleic acid, linolic acid, linoleic acid, lauric acid, palmitic acid, stearic acid or the like or rosin acid, for example, dihydroabietic acid, tetrahydroabietic acid or the like, with a base capable of forming a water-soluble surfactant, such as hydroxides of ammonium or alkali metal or an alcoholamine, for example, triethanolamine.

Further, the use of a relatively small amount of a stabilizer can result in an increase of the mechanical stability and the stability during production of the aqueous dispersion. As the stabilizer, there may preferably be employed phosphates, such as sodium orthophosphate, sodium metaphosphate, sodium tetraphosphate and the like and ethylenediamine tetraacetate and salts thereof. About 0.25 to 2 parts by weight of a phosphate is suitable for the production of a highly stable aqueous dispersion, and in particular, 0.5 to 1.5 parts by weight of phosphate is desirable.

A thickener or a protective colloid which increases the stability may be added. As the thickener and protective colloid, there may be used polyvinyl alcohol, polyvinyl methyl ether, polyethylene oxide, polyacrylic acid derivatives and methyl cellulose derivatives such as sodium or ammonium salt of polyacrylic acid, polyacrylamide, methyl cellulose, oxypropylmethyl cellulose, carboxymethyl cellulose; synthetic sizes, such as vinyl acetate-maleic anhydride copolymer, olefin-acrylic acid copolymers, and olefin-acrylic acid salt copolymers; animal sizes, such as gelatine and casein; and vegetable sizes, such as arginic acid salts, gum arabic, starch or the like. The amount of the thickener or protective colloid may be varied depending upon uses, though in many cases it is preferably 0.5 to 5 parts by weight per 100 parts by weight of the copolymer.

The aqueous dispersion of this invention can be prepared by any dispersing method. The olefin-acrylate copolymer is soluble in various solvents. For instance, hydrocarbons, halogenated hydrocarbons, esters, ketones, amides and ethers may widely be used. The viscosity of the copolymer solution is preferably up to 6,000 centipoises. In order to mix such a copolymer solution with water and disperse the solution in water, various dispersing apparatus may be used such as a high speed stirrer and a high shear strength generator, e.g., line mixer, homogenizer, dispersator, colloid mill, Gaulin or alternatively, an emulsifying machine utilizing cavitation action, such as ultrasonic emulsifying machine. In particular, a good result can be obtained by a method of obtaining an aqueous dispersion by means of phase inversion by adding water to a polymerization liquid. For example, the surface active agent is dissolved in the olefin-acrylate copolymer solution, to which is then added under strong stirring water containing dissolved therein a stabilizer, dispersing agent and thickener to emulsify the solution. The solvent is thereafter removed and, if necessary, the emulsion is concentrated, and in some cases, the pH thereof is then adjusted to obtain an aqueous dispersion. The concentration may be effected by means of creaming, centrifuge or stripping.

In stripping the solvent from the emulsion, there may be used a disk evaporator, a falling film evaporator, thin film evaporators such as Kontro, Sambary, LUWA, and Smith types and so on, though the stripping is preferably effected under reduced pressure. In some cases, foaming is caused during the stripping, and in this case, a small amount of air is externally blown into the emulsion to defoam it, or a defoaming agent is added to prevent foaming over. As the defoaming agent, there may be used polyalkylene glycols, such as nonyl glycol, heptyl glycol, diethylene glycol, or the like; octyl alcohol, n-butyl alcohol, lauryl alcohol, capryl alcohol, cyclohexanol, betanaphthol, sulfonated sperm oil, methyl silicone oil + silica aerogel, silicone resin emulsion; ethers such as diethylene glycol monoheptyl ether, di-tert-amylphenoxyethanol or the like; phosphoric esters, such as trioctyl phosphate, tributyl phosphate or the like; and fatty acid esters, such as diethylene glycol laurate, sorbitan laurate, polyoxyethylene sorbitan laurate, diethyl phthalate or the like.

The concentration of the dispersion of this invention is preferably 65 to 20% by weight, and in practice, it is preferably 55 to 30% by weight. Above 65% by weight, stability is not satisfactory.

This invention is further explained in detail with reference to Examples below, which is by way of illustration and not by way of limitation.

EXAMPLE 1

TO 100 parts by weight of a 10% by weight solution in toluene of an isobutylene-ethyl acrylate copolymer (isobutylene 51.7 mole percent, and ethyl acrylate 48.3 mole percent) having an intrinic viscosity of 1.48 dl/g as measured in benzene at 30° C was added 5 parts by weight of sodium laurylbenzenesulfonate, and the latter was well dissolved in the former. Separately, 1 part by weight of polyvinyl alcohol (complete saponification type, 5.2 cps, 4% aqueous solution, 20° C) and 0.25 part by weight of sodium tetraphosphate were completely dissolved in 500 parts by weight of water to prepare an aqueous solution. The above solution in toluene was first stirred at a low speed, and the above aqueous solution was stirred into the solution in toluene to prepare a W/O type emulsion. The stirring speed was gradually increased and the amount of the aqueous solution was also increased, upon which the viscosity of the emulsion increased. By further adding water thereto, the emulsion was inverted to an O/W type emulsion. After the inversion, the above aqueous solution was further added and the resulting emulsion was stirred at a high speed for a further 30 min. In this case, cooling was effected so that the temperature of the liquid became up to 30° C to prevent increase of temperature. The thus obtained emulsion was allowed to stand for one day, after which the toluene was removed at 30° C under reduced pressure while blowing air by means of a rotary evaporator to prevent foaming. At this time, a part of water was also removed as azeotrope with toluene. It was confirmed by gas chromatography that toluene and ethyl acrylate were not present in the aqueous dispersion. Until the desired solid content was reached, the water was removed by means of the rotary evaporator under reduced pressure at 30° C or by means of a centrifuge.

The thus obtained liquid was a stable aqueous dispersion in which the isobutylene-ethyl acrylate copolymer substantially formed the dispersed phase and water formed the continuous phase and which had a solid content of 46.2% and a particle size of 0.5 to 1.5 microns.

EXAMPLE 2

In the same manner as in Example 1, except that another surfactant as shown in Table 1 was substituted for the sodium laurylbenzenesulfonate, an aqueous dispersion was prepared. As a result, a stable aqueous dispersion was obtained as shown in Table 1. The copolymer used was the same as in Example 1, and the numerals in parentheses in Table 1 were parts by weight per 100 parts by weight of the copolymer.

by weight of polyvinyl alcohol. As a result, there was obtained a stable aqueous dispersion having a solid content of 45% and a particle size of 0.2 – 2 microns.

Comparing the infrared absorption spectrum of the copolymer in the solution in toluene used in the preparation of the above aqueous dispersion with that of a film formed from a solution in toluene of the copolymer separated by adding n-heptane to the aqueous dispersion just after the preparation thereof, it was confirmed that the absorption by acryloyl chloride at 1790 $cm^{-1}$ hardly changed. Further, after 3 months, a film was formed in the same manner as above, and an infrared absorption spectrum thereof was obtained, which indicated that acryloyl chloride hardly changed.

Table 1

| Run No. | Emulsifier | Protective colloid | Particle size ($\mu$) | Solid content (%) | pH | Remarks |
|---|---|---|---|---|---|---|
| 1 | Sodium dialkyl-sulfosuccinate* (5) | Polyvinyl alcohol (2) | 0.5 – 1 | 45 | 8 | Good aqueous dispersion |
| 2 | Sodium dialkyl-sulfosuccinate (5) | None | 0.5 – 1 | 40 | 8 | Same as above |
| 3 | Polyethylene glycol oleate** (5) | Polyvinyl alcohol (2) | 1 – 2 | 55 | 7 | Excellent in chemical stability |
| 4 | Oleic acid (1) Triethanolamine (3) | None | 0.5 – 1 | 65 | 9 | pH was adjusted to 9 with ammonia. Somewhat inferior in chemical stability |
| 5 | None | Sodium poly-acrylate (3) | 0.5 – 1 | 30 | — | Inferior in chemical stability, but viscosity was high. |

*Neccol P, a trade mark of Dai-ichi Kogyo Yakuhin
**Noigen ES 160, a trade mark of Dai-ichi Kogyo Yakuhin

EXAMPLE 3

In the same manner as in Example 1, an aqueous dispersion was prepared using a solution consisting of 100 parts by weight of a 10% by weight solution in toluene of an isobutylene-ethyl acrylate-acryloyl chloride terpolymer consisting of 52.3 mole percent of isobutylene, 42.0 mole percent of ethyl acrylate and 5.7 mole percent of acryloyl chloride ($[\eta] = 3.22$ dl/g as measured in the form of a methyl ester in benzene at 30° C) and 0.5 part by weight of sodium dialkylsulfosuccinate (Neocol P) and an aqueous solution consisting of 100 parts by weight of water and 0.5 part by weight of polyvinyl alcohol. As a result, there was obtained a stable aqueous dispersion having a solid concentration of 32% and a particle size of 0.8 – 3 microns.

An aqueous dispersion obtained in the same manner as above except for using no polyvinyl alcohol was inferior to the above aqueous dispersion in chemical stability.

EXAMPLE 4

In the same manner as in Example 3, an aqueous dispersion was prepared using a solution consisting of 200 parts by weight of a 30% by weight solution in toluene of an isobutylene-methyl acrylate-crotyl acrylate-acryloyl chloride quadripolymer consisting of 50.1 mole percent of isobutylene, 36.0 mole percent of methyl acrylate, 6.6 mole percent of crotyl acrylate and 7.3 mole percent of acryloyl chloride ($[\eta] = 1.45$ dl/g as measured in the form of a methyl ester in benzene at 30° C) and 2.5 parts by weight of polyoxyethylene lauryl ether (Noigen ET 170) and an aqueous solution consisting of 200 parts by weight of water and 2.5 parts

EXAMPLE 5

A terpolymer consisting of 49.1 mole percent of isobutylene, 45.7 mole percent of methyl acrylate and 5.2 mole percent of maleic anhydride was dissolved in toluene to form 100 g of a 19% by weight polymer solution. In this solution was dissolved 0.95 g of polyethylene glycol lauryl ether as emulsifier, and to the resulting solution was gradually added with stirring by means of a homomixer a solution of 0.5 g of polyvinyl alcohol in 50 g of water, upon which phase inversion was caused to obtain a stable emulsion. This emulsion was concentrated by means of a rotary evaporator to form an emulsion free from toluene. After the emulsion was allowed to stand for 30 days, the emulsion was subjected to measurement of infrared absorption spectrum to find that the absorption due to the acid anhydride did not substantially change.

EXAMPLE 6

In the same manner as in Example 5, 1 g of sodium dodecylbenzene sulfonate was dissolved in 100 g of a 23.6% by weight solution in ethylene dichloride of a terpolymer consisting of 49.5 mole percent of isobutylene, 25.0 mole percent of maleic anhydride and 25.5 mole percent of methyl acrylate, and the resulting solution was stirred by means of a homomixer, while 30 g of water containing 0.2 g of polyvinyl alcohol was gradually added thereto, upon which phase inversion was caused to obtain an emulsion. After concentration, the emulsion free from the solvent had a solids content of 40% by weight.

What is claimed is:

1. An aqueous dispersion of a copolymer in water, characterized in that the copolymer is an olefin-acrylate copolymer, said olefin being at least one member selected from the group consisting of olefins having 3 to 20 carbon atoms, said acrylate being at least one member selected from the group consisting of esters of acrylic acid in which the alcohol moiety is a hydrocarbon or halohydrocarbon group having 1 to 20 carbon atoms, said copolymer containing 5 to 60 mole percent of the olefin, 40 to 95 mole percent of the acrylate and 0 to 30 mole percent of at least one member selected from the group consisting of acryloyl halides and maleic anhydride;

is present in a proportion of 1 to 300 parts by weight per 100 parts by weight of water; and forms substantially dispersed phase, and water forms the continuous phase.

2. An aqueous dispersion according to claim 1, wherein the copolymer is a binary olefin-acrylate copolymer.

3. An aqueous dispersion according to claim 1, wherein the olefin of the copolymer is selected from the group consisting of terminally unsaturated and internally unsaturated olefin compounds having 3 to 20 carbon atoms and those having halogen, cycloaliphatic or aromatic group at other position than double bond.

4. An aqueous dispersion according to claim 1, wherein the olefin of the copolymer is an aliphatic alpha-olefinic hydrocarbon compound.

5. An aqueous dispersion according to claim 1, wherein the olefin of the copolymer is selected from the group consisting of isobutylene, propylene, butene-1, butene-2, pentene-1, 2-methyl-butene-1, hexene-1, 4-methyl-pentene-1, 2-methyl-pentene-1, cyclopentene, norbornene-2, vinylcyclobutane, and 2-methyl-4-chloro-pentene-1.

6. An aqueous dispersion of a copolymer in water, characterized in that the copolymer is an olefin-acrylate copolymer, said olefin being at least one member selected from the group consisting of propylene and isobutylene, said acrylate being at least one member selected from the group consisting of esters of acrylic acid in which the alcohol moiety is a hydrocarbon or halohydrocarbon group having 1 to 20 carbon atoms, said copolymer containing 5 to 60 mole percent of the olefin, 40 to 95 mole percent of the acrylate and 0 to 30 mole percent of at least one member selected from the group consisting of acryloyl halides and maleic anhydride;

is present in a proportion of 1 to 300 parts by weight per 100 parts by weight of water; and forms substantially dispersed phase, and water forms the continuous phase.

7. An aqueous dispersion according to claim 1, wherein the alcohol moiety is a member selected from the group consisting of alkyl, aryl, aralkyl, alkylaryl, cycloalkyl, alkenyl, aralkenyl, alkenylaryl, cycloalkenyl and halogen-substituted derivatives thereof.

8. An aqueous dispersion according to claim 1, wherein the acrylate of the copolymer is at least one member selected from the group consisting of methyl acrylate, ethyl acrylate, propyl acrylate, n-butyl acrylate, t-butyl acrylate, n-amyl acrylate, n-hexyl acrylate, 2-ethylhexyl acrylate, octadecyl acrylate, o-tolyl acrylate, benzyl acrylate, cyclohexyl acrylate, 2-chloroethyl acrylate, vinyl acrylate, allyl acrylate, isobutenyl acrylate, 1'-butenyl acrylate, crotyl acrylate, 2'-butenyl acrylate, cinnamyl acrylate, 3'-cyclopentenyl acrylate, citronellyl acrylate, geranyl acrylate, 5'-norbornen-2'-yl-methyl acrylate, and beta-chloroallyl acrylate.

9. An aqueous dispersion according to claim 2, wherein the acrylate of the copolymer is methyl acrylate, ethyl acrylate or crotyl acrylate.

10. An aqueous dispersion according to claim 9, wherein the olefin of the copolymer is propylene or isobutylene.

11. An aqueous dispersion according to claim 1, wherein the copolymer is of propylene or isobutylene and methyl, ethyl, n-butyl, 2-ethylhexyl, crotyl or allyl acrylate.

12. An aqueous dispersion according to claim 1, wherein the copolymer contains 30 to 50 mole percent of the olefin and 50 to 70 mole percent of the acrylate.

13. An aqueous dispersion according to claim 1, wherein the copolymer is an alternating copolymer.

14. An aqueous dispersion of a multi-component copolymer in water, characterized in that the copolymer is an olefinacrylate copolymer, said olefin being at least one member selected from the group consisting of olefins having 3 to 20 carbon atoms, said acrylate being at least one member selected from the group consisting of esters of acrylic acid in which the alcohol moiety is a hydrocarbon or halohydrocarbon group having 1 to 20 carbon atoms, said copolymer containing 5 to 60 mole percent of the olefin, 40 to 95 mole percent of the acrylate and 0.1 to 25 mole percent of at least one member selected from the group consisting of acryloyl halides and maleic anhydride;

is present in a proportion of 1 to 300 parts by weight per 100 parts by weight of water; and forms substantially dispersed phase, and water forms the continuous phase.

15. An aqueous dispersion according to claim 14, wherein the proportion of the third component is 0.1 to 20 mole percent.

16. An aqueous dispersion according to claim 14, wherein the third component is acryloyl chloride.

17. An aqueous dispersion according to claim 14, wherein the third component is maleic anhydride.

18. An aqueous dispersion according to claim 16, wherein the olefin is at least one member selected from the group consisting of propylene and isobutylene, and the acrylate is at least one member selected from the group consisting of methyl acrylate ethyl acrylate and crotyl acrylate.

19. An aqueous dispersion according to claim 14, wherein the copolymer is an alternating multi-component copolymer.

20. An aqueous dispersion according to claim 1, wherein the copolymer has an intrinsic viscosity of 0.1 to 10 dl/g as measured in benzene at 30° C.

21. An aqueous dispersion according to claim 1, which further contains a surface active agent in a proportion of 0.1 to 20 parts by weight per 100 parts by weight of the copolymer.

22. An aqueous dispersion according to claim 21, wherein the surface active agent is selected from the group consisting of anionic and nonionic surfactants.

23. An aqueous dispersion according to claim 21, wherein the surface active agent is a member selected from the group consisting of alkylnaphthalenesulfonates, dialkylsulfosuccinates, salts of higher alcohol esters of sulfuric acid, naphthalenesulfonic acid-formaldehyde condensate, polyoxyethylene sulfates, polyoxyethylene alkyl ethers, polyoxyethylene alkylphenyl ethers, polyoxyethylene acyl esters, sorbitan esters of fatty acids, polyoxyethylene alkylamides, alkylamine salts, polyoxyethylene alkylamine salts, and alkylamine acetic acid salts, and combinations of organic acids capable of forming surfactant and bases capable of forming water-soluble surfactant.

24. An aqueous dispersion according to claim 21, wherein the surface active agent is sodium laurylbenzenesulfonate, sodium dialkylsulfosuccinate, polyethylene glycol oleate or a combination of oleic acid and triethanolamine.

* * * * *